United States Patent
Chou et al.

(10) Patent No.: US 11,886,263 B2
(45) Date of Patent: Jan. 30, 2024

(54) SIGNAL RE-DRIVING DEVICE, DATA STORAGE SYSTEM AND MODE CONTROL METHOD

(71) Applicant: PHISON ELECTRONICS CORP., Miaoli (TW)

(72) Inventors: Po-Jung Chou, Taipei (TW); Sheng-Wen Chen, Hsinchu County (TW); Chung-Kuang Chen, Nantou County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 173 days.

(21) Appl. No.: 17/458,548

(22) Filed: Aug. 27, 2021

(65) Prior Publication Data
US 2023/0035428 A1 Feb. 2, 2023

(30) Foreign Application Priority Data
Aug. 2, 2021 (TW) .................................. 110128285

(51) Int. Cl.
*G06F 1/26* (2006.01)
*G06F 13/40* (2006.01)

(52) U.S. Cl.
CPC ............ *G06F 1/26* (2013.01); *G06F 13/4022* (2013.01)

(58) Field of Classification Search
CPC ...... G06F 1/26; G06F 13/4022; G06F 1/3268; G06F 1/3287; G06F 3/0634; G06F 1/3203; G06F 1/266; G06F 1/3234; G06F 1/325; G06F 1/3265; G06F 1/3293; Y02D 10/00; Y02D 30/50; Y02D 30/00
See application file for complete search history.

(56) References Cited

U.S. PATENT DOCUMENTS

| | | | | |
|---|---|---|---|---|
| 5,418,815 A | * | 5/1995 | Ishikawa | H04N 21/426 455/142 |
| 5,598,430 A | * | 1/1997 | Hachisuka | H04L 27/0008 375/216 |
| 5,883,590 A | * | 3/1999 | Sugden | H03M 1/48 341/155 |
| 6,934,342 B1 | * | 8/2005 | Ishii | H04B 1/406 455/142 |

(Continued)

OTHER PUBLICATIONS

SiliconVSLI, "Why do Digital circuits use less power than Analog Circuit", Feb. 13, 2023, retrieved from the Internet on Jul. 31, 2023 at <https://siliconvlsi.com/why-do-digital-circuits-use-less-power-than-analog-circuit/>.*

(Continued)

*Primary Examiner* — Faisal M Zaman
(74) *Attorney, Agent, or Firm* — JCIPRNET

(57) ABSTRACT

A signal re-driving device, a data storage system and a mode control method are provided. The method includes the following steps. A first signal is received via a receiving circuit of the signal re-driving device. An analog signal feature is detected the receiving circuit. A first mode is entered according to the analog signal feature. The first signal is modulated and a second signal is outputted in the first mode. The second signal is sent via a sending circuit of the signal re-driving device. A digital signal feature is detected via the receiving circuit. And, the first mode is switched to a second mode according to the digital signal feature.

30 Claims, 6 Drawing Sheets

(56) References Cited

U.S. PATENT DOCUMENTS

| | | | |
|---|---|---|---|
| 7,007,182 B1* | 2/2006 | Tsumura | H04L 12/12 |
| | | | 713/324 |
| 8,804,482 B2* | 8/2014 | Rhelimi | H04L 5/1423 |
| | | | 370/282 |
| 10,491,235 B1* | 11/2019 | Ruelke | H04L 1/0025 |
| 2005/0220218 A1 | 10/2005 | Jensen et al. | |
| 2010/0086011 A1 | 4/2010 | Liu | |
| 2013/0346779 A1 | 12/2013 | Chang | |
| 2014/0233776 A1* | 8/2014 | Krogsgaard | H04R 25/02 |
| | | | 381/323 |
| 2019/0144020 A1* | 5/2019 | Toth | B61L 23/00 |
| | | | 246/167 R |
| 2019/0340146 A1* | 11/2019 | Chen | H03K 5/2481 |
| 2023/0035428 A1* | 2/2023 | Chou | G06F 1/3268 |

OTHER PUBLICATIONS

"Office Action of Taiwan Counterpart Application", dated Mar. 31, 2022, p. 1-p. 8.

"Office Action of China Counterpart Application", dated Jan. 5, 2023, p. 1-p. 6.

\* cited by examiner

SIGNAL RE-DRIVING DEVICE, DATA STORAGE SYSTEM AND MODE CONTROL METHOD

CROSS-REFERENCE TO RELATED APPLICATION

This application claims the priority benefit of Taiwan application serial no. 110128285, filed on Aug. 2, 2021. The entirety of the above-mentioned patent application is hereby incorporated by reference herein and made a part of this specification.

BACKGROUND

Technical Field

This disclosure relates to a circuit control technology, and in particular to a signal re-driving device, a data storage system, and a mode control method.

Description of Related Art

A signal re-driver may generally be used to extend a transmission distance of a signal. Besides using the signal re-driver to improve the quality of a high-speed signal, a user also wishes for a standby/power-saving mode to reduce power consumption. However, the signal will be lost if the signal re-driver switches from the standby/power-saving mode to a normal transmission mode at an inappropriate timing. Therefore, how to control the transition of the signal re-driver between the standby/power-saving mode and the normal transmission mode remains a challenge for those skilled in the art.

SUMMARY

An exemplary embodiment of the disclosure provides a signal re-driving device, a data storage system, and a mode control method, which may enable the signal re-driving device to maintain a balance between power saving and good signal transmission quality.

An exemplary embodiment of the disclosure provides the signal re-driving device, which includes a receiving circuit, a modulation circuit, a sending circuit, and a mode control circuit. The modulation circuit is coupled to the receiving circuit. The sending circuit is coupled to the modulation circuit. The mode control circuit is coupled to the receiving circuit and the modulation circuit. The receiving circuit is configured to receive a first signal. The mode control circuit is configured to detect an analog signal feature via the receiving circuit and control the modulation circuit to enter a first mode according to the analog signal feature. In the first mode, the modulation circuit is configured to modulate the first signal and output a second signal. The sending circuit is configured to send the second signal. The mode control circuit is further configured to detect a digital signal feature via the receiving circuit and control the modulation circuit to switch from the first mode to a second mode according to the digital signal feature.

An exemplary embodiment of the disclosure further provides the data storage system, which includes a processing device, a memory storage device, and a signal re-driving device. The signal re-driving device is coupled between the processing device and the memory storage device. The signal re-driving device is configured to receive a first signal from the processing device via the receiving circuit in the signal re-driving device. The signal re-driving device is further configured to detect an analog signal feature via the receiving circuit and enter a first mode according to the analog signal feature. In the first mode, the signal re-driving device is further configured to modulate the first signal and output a second signal. The signal re-driving device is further configured to send the second signal to the memory storage device via the sending circuit in the signal re-driving device. The signal re-driving device is further configured to detect a digital signal feature via the receiving circuit and switch from the first mode to a second mode according to the digital signal feature.

An exemplary embodiment of the disclosure further provides the mode control method, which is applicable to a signal re-driving device. The mode control method includes the following steps. A first signal is received via a receiving circuit of the signal re-driving device. An analog signal feature is detected via the receiving circuit. A first mode is entered according to the analog signal feature. In the first mode, the first signal is modulated and a second signal is outputted. The second signal is sent via a sending circuit of the signal re-driving device. A digital signal feature is detected via the receiving circuit. And, the first mode is switched to a second mode according to the digital signal feature.

Based on the foregoing, the analog signal feature of the receiving circuit may be detected and the signal re-driving device may enter the first mode according to the analog signal feature after the receiving circuit of the signal re-driving device receives the first signal. In the first mode, the signal re-driving device may modulate the first signal and send the second signal via the sending circuit of the signal re-driving device. Thereafter, the digital signal feature of the receiving circuit may be detected, and the signal re-driving device may switch from the first mode to the second mode according to the digital signal feature. In this way, the signal re-driving device can maintain a balance between power saving and good signal transmission quality.

To make the abovementioned more comprehensible, several embodiments accompanied by drawings are described in detail as follows.

DESCRIPTION OF THE EMBODIMENTS

A number of exemplary embodiments are presented below to illustrate the disclosure, but the disclosure is not limited to the multiple exemplary embodiments illustrated. Also, appropriate combinations among the exemplary embodiments are allowed. The term "coupled to" used in the text of the specification of this case (including the scope of the patent application) may refer to any direct or indirect connection means. For example, when the text describes that a first device is coupled to a second device, it should be interpreted as that the first device may be directly connected to the second device, or the first device may be indirectly connected to the second device through other devices or some kind of connection means. In addition, the term "signal" may refer to at least a current, voltage, charge, temperature, data, or any other one or more signals.

Figure 1:
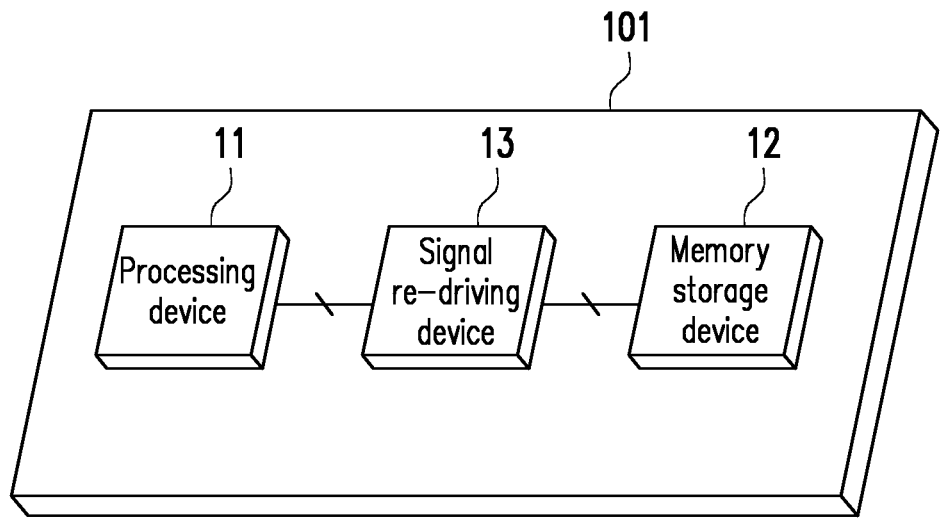
FIG. 1 is a schematic diagram of a data storage system according to an exemplary embodiment of the disclosure.

FIG. 1 is a schematic diagram of a data storage system according to an exemplary embodiment of the disclosure. With reference to FIG. 1, a data storage system 10 includes a processing device 11, a memory storage device 12, and a signal re-driving device 13. The processing device 11 may communicate with the memory storage device 12 via the signal re-driving device 13. For example, the processing device 11 may send a signal to the memory storage device 12 via the signal re-driving device 13, so as to access the memory storage device 12. For example, the processing device 11 may include a central processing unit (CPU), or other programmable general-purpose or special-purpose microprocessors, a digital signal processor (DSP), a programmable controller, an application-specific integrated circuit (ASIC), a programmable logic device (PLD), or other similar devices, or a combination of these devices.

The memory storage device 12 is configured to store data non-volatilely. For example, the memory storage device 12 may include an external storage device such as a flash drive, a memory card, a solid state drive (SSD), or a wireless memory storage device. Alternatively, the memory storage device 12 may also include an embedded storage device such as an embedded Multi-Media Card (eMMC) or an embedded Multi-Chip Package (eMCP) storage device.

The signal re-driving device 13 is coupled between the processing device 11 and the memory storage device 12. For example, the signal re-driving device 13 may be disposed on a signal transmission path between the processing device 11 and the memory storage device 12. The signal re-driving device 13 may be configured to modulate a signal transmitted between the processing device 11 and the memory storage device 12, so as to extend a transmission distance of the signal. For example, the signal re-driving device 13 may include a signal re-driver. For example, the signal re-driving device 13 may perform high-frequency compensation and/or low-frequency compensation on the signal transmitted between the processing device 11 and the memory storage device 12, so as to improve signal quality of the signal.

In an exemplary embodiment, the processing device 11, the memory storage device 12, and the signal re-driving device 13 may be disposed on a motherboard 101 and communicate with each other via the motherboard 101. For example, the memory storage device 12 may be embedded on the motherboard 101 through an embedded installation means. In an exemplary embodiment, the memory storage device 12 may be installed on the motherboard 101 (that is, electrically connected to the motherboard 101) in a pluggable manner through a Peripheral Component Interconnect Express (PCI Express) slot, a Serial Advanced Technology Attachment (SATA) slot, a universal serial bus (USB) slot, or a similar bus slot. In addition, in an exemplary embodiment, the memory storage device 12 may also be electrically connected to the motherboard 101 in an external manner and communicate with the signal re-driving device 13 (and the processing device 11) via the motherboard 101.

It should be noted that, in an exemplary embodiment, the signal re-driving device 13 may also be configured to modulate a signal transmitted between other types of electronic devices (or electronic circuits), and is not limited to being applicable to the data storage system 10 in FIG. 1. In addition, in an exemplary embodiment, the signal re-driving device 13 may also be included in the processing device 11 (or the memory storage device 12) in FIG. 1, or other types of electronic devices (or electronic circuits).

Figure 2:
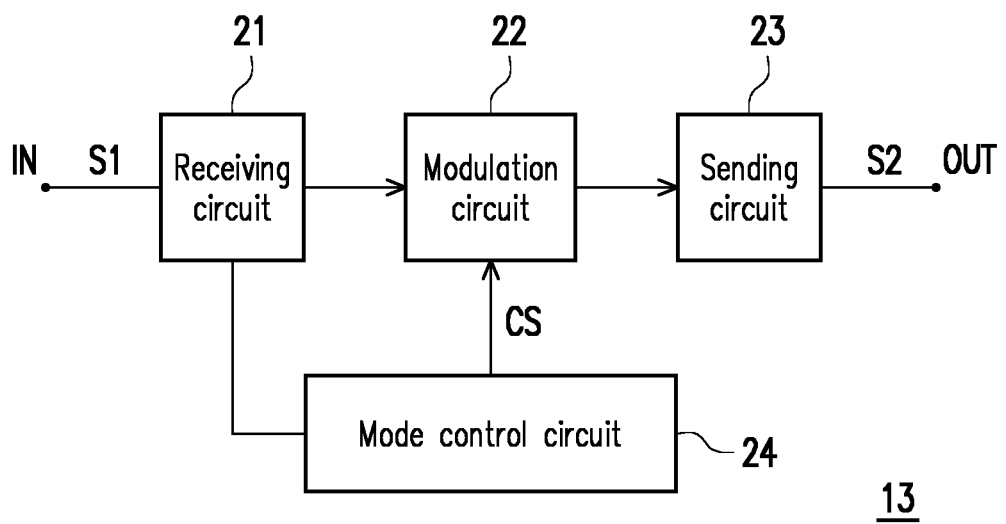
FIG. 2 is a schematic diagram of the signal re-driving device according to an exemplary embodiment of the disclosure.

FIG. 2 is a schematic diagram of the signal re-driving device according to an exemplary embodiment of the disclosure. With reference to FIG. 2, the signal re-driving device 13 includes a receiving circuit 21, a modulation circuit 22, a sending circuit 23, and a mode control circuit 24. The receiving circuit 21 is coupled to a signal input terminal IN. The sending circuit 23 is coupled to a signal output terminal OUT. The modulation circuit 22 is coupled between the receiving circuit 21 and the sending circuit 23. The mode control circuit 24 is coupled to the receiving circuit 21 and the modulation circuit 22. It should be noted that the following description of each circuit module in the signal re-driving device 13 is equivalent to describing functions provided by the signal re-driving device 13 as a whole.

The receiving circuit 21 may receive a signal S1 from the signal input terminal IN. The mode control circuit 24 may detect an analog signal feature via the receiving circuit 21 and control the modulation circuit 22 to enter a specific mode (also referred to as a first mode) according to the analog signal feature. For example, the analog signal feature may reflect a signal receiving state of the receiving circuit 21 based on an analog (or analog signal) form. In the first mode, the modulation circuit 22 may modulate the signal S1 and output a signal (also referred to as a second signal) S2. For example, in the first mode, the modulation circuit 22 may modulate the signal S1 and output the signal S2 according to a modulation result of the signal S1. For example, the modulation executed by the modulation circuit 22 on the signal S1 may include performing high-frequency compensation and/or low-frequency compensation on the signal S1. The signal S2 may reflect a compensation result by the modulation circuit 22 on the signal S1. For example, a signal quality of the signal S2 may be higher than a signal quality of the signal S1. The sending circuit 23 may be configured to send the signal S2. In addition, the mode control circuit 24 may detect a digital signal feature via the receiving circuit 21 and control the modulation circuit 22 to switch from the first mode to another mode (also referred to as a second mode) according to the digital signal feature. For example, the digital signal feature may reflect the signal receiving state of the receiving circuit 21 based on a digital (or digital signal) form.

In an exemplary embodiment, a power consumption of the modulation circuit 22 operating in the first mode is greater than a power consumption of the modulation circuit 22 operating in the second mode. Similarly, a power consumption of the signal re-driving device 13 operating in the first mode is greater than a power consumption of the signal re-driving device 13 operating in the second mode.

In an exemplary embodiment, the first mode is also referred to as a normal operating mode. In the first mode, the modulation circuit 22 may operate normally to modulate the signal S1. In an exemplary embodiment, the second mode is also referred to as an energy-saving mode or a standby mode. In the second mode, the modulation circuit 22 may be in an energy-saving or standby state and does not modulate any signal.

In an exemplary embodiment, the mode control circuit 24 may send a signal (also referred to as a control signal) CS to the modulation circuit 22. The signal CS may be configured to control an operation mode of the modulation circuit 22. For example, when the signal CS includes a certain signal (also referred to as a first control signal), the modulation circuit 22 may operate in the first mode according to the first control signal. Alternatively, when the signal CS includes another signal (also referred to as a second control signal), the modulation circuit 22 may operate or switch to the second mode according to the second control signal.

In an exemplary embodiment, in the second mode (that is, the energy-saving mode or the standby mode), the mode control circuit 24 may detect the analog signal feature via the receiving circuit 21. For example, the analog signal feature may reflect in an analog form whether the signal S1 exists. The mode control circuit 24 may control the modulation circuit 22 to switch from the second mode to the first mode (that is, the normal operating mode) via the signal CS in response to the analog signal feature satisfying a specific condition (also referred to as a first condition). For example, the first condition reflects the existence of the signal S1 (that is, the receiving circuit 21 has received the signal S1). In the first mode (or when entering the first mode), the modulation circuit 22 may be enabled (for example, awakened) to modulate the signal S1 and output the signal S2. In addition, when the analog signal feature does not meet the first condition (indicating that the receiving circuit 21 has not received the signal S1), the mode control circuit 24 may control the modulation circuit 22 to remain in the second mode.

In an exemplary embodiment, in the first mode (that is, the normal operating mode), the mode control circuit 24 may detect the digital signal feature via the receiving circuit 21. For example, the digital signal feature may reflect cumulative disappearance time of the signal S1 in a digital form. For example, the cumulative disappearance time of the signal S1 may reflect that the receiving circuit 21 has not received the signal S1 again after a specific period of time has passed when the signal S1 has disappeared from the receiving circuit 21. For example, the digital signal feature may reflect a length of time of the specific period of time. The mode control circuit 24 may control the modulation circuit 22 to switch from the first mode to the second mode (that is, the energy-saving mode or the standby mode) via the signal CS in response to the digital signal feature meeting a specific condition (also referred to as a second condition). For example, the second condition reflects that the cumulative disappearance time of the signal S1 has reached a threshold value. In the second mode (or when entering the second mode), the modulation circuit 22 may be disabled and wait to be awakened again. In addition, when the digital signal feature does not meet the second condition (indicating that the cumulative disappearance time of the signal S1 has not reached the threshold value), the mode control circuit 24 may control the modulation circuit 22 to remain in the first mode.

From another perspective, when the modulation circuit 22 is in the energy-saving mode or the standby mode, the mode control circuit 24 may continuously detect the analog signal feature via the receiving circuit 21. The analog signal feature may reflect whether the receiving circuit 21 currently receives a new signal S1. At a certain time point, when the receiving circuit 21 receives a new signal S1, the mode control circuit 24 may determine that the analog signal feature meets the first condition. The mode control circuit 24 may wake up the modulation circuit 22 and control the modulation circuit 22 to enter the normal operating mode in response to the analog signal feature meeting the first condition. In the normal working mode, the modulation circuit 22 may continuously modulate the signal S1 until the receiving circuit 21 no longer receives the signal S1.

In other words, according to the analog signal feature, once the receiving circuit 21 receives the new signal S1, the mode control circuit 24 may immediately wake up the modulation circuit 22 to process the signal S1. In this way, awakening efficiency of the modulation circuit 22 may be effectively improved, and loss of specific information carried in the signal S1 due to late awakening of the modulation circuit 22 may be prevented.

On the other hand, when the modulation circuit 22 is in the normal operating mode, the mode control circuit 24 may continuously detect the digital signal feature via the receiving circuit 21. The digital signal feature may reflect that the receiving circuit 21 has not received the new signal S1 for a specific period of time. At a certain time point, when the specific period of time (that is, the cumulative disappearance time of the signal S1) reaches a threshold value, the mode control circuit 24 may determine that the digital signal feature meets the second condition. The mode control circuit 24 may control the modulation circuit 22 to enter the energy-saving mode or the standby mode in response to the digital signal feature meeting the second condition, so as to save power consumption of the modulation circuit 22 (or the signal re-driving device 13).

That is, according to the digital signal feature, the mode control circuit 24 may allow the modulation circuit 22 to enter the energy-saving mode or the standby mode (only) after receiving circuit 21 has not received the new signal S1 for a specific period of time. In this way, the modulation circuit 22 may be allowed to enter the energy-saving mode or the standby mode at a correct timing as far as possible, thereby reducing a probability of the modulation circuit 22 repeatedly switching between being awakened and sleeping in a short period of time.

Figure 3:
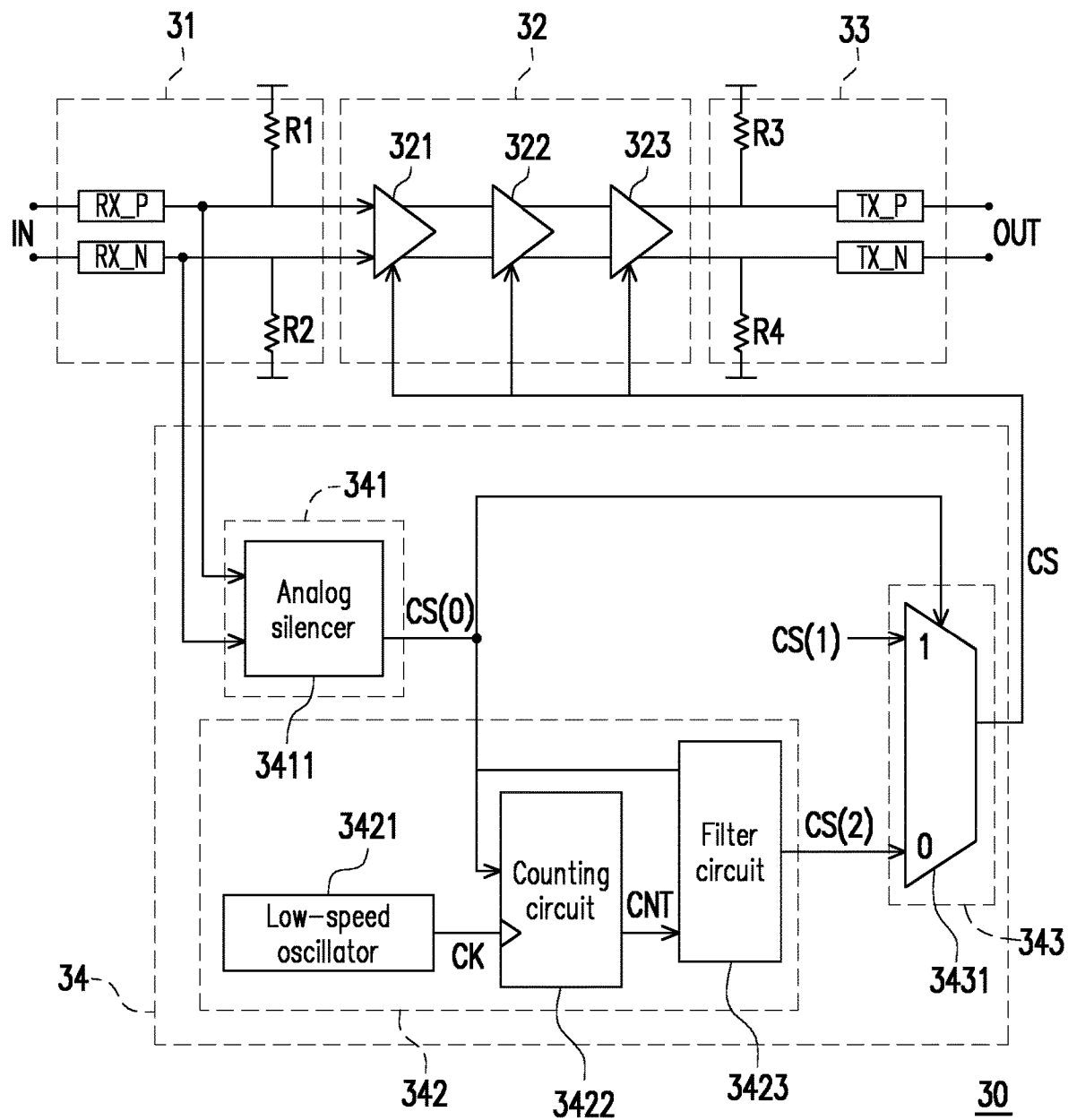
FIG. 3 is a schematic diagram of a signal re-driving device according to an exemplary embodiment of the disclosure.

FIG. 3 is a schematic diagram of a signal re-driving device according to an exemplary embodiment of the disclosure. With reference to FIG. 3, a signal re-driving device 30 includes a receiving circuit 31, a modulation circuit 32, a sending circuit 33, and a mode control circuit 34. It should be noted that the receiving circuit 31, the modulation circuit 32, the sending circuit 33, and the mode control circuit 34 may be respectively the same or similar to the receiving circuit 21, the modulation circuit 22, the sending circuit 23, and the mode control circuit 24 in FIG. 2.

The receiving circuit 31 may include receiving terminals RX_P and RX_N. The receiving terminals RX_P and RX_N may be configured to receive the signal S1 having orthogonal signals. Impedance elements R1 and R2 may provide termination impedances to the receiving terminals RX_P and RX_N.

The modulation circuit 32 includes modulation elements 321 to 323. The modulation elements 321 to 323 are configured to modulate the signal S1 and output the signal S2. For example, the modulation elements 321 to 323 may include a Continuous Time Linear Equalizer (CTLE), a variable gain amplifier (VGA), and/or a modulation drive. It should be noted that the disclosure does not limit total number and types of the modulating elements 321 to 323.

The sending circuit 33 may include sending terminals TX_P and TX_N. The sending terminals TX_P and TX_N can be configured to transmit the signal S2 having orthogonal signals. Impedance elements R3 and R4 may provide termination impedances to the sending terminals TX_P and TX_N.

The mode control circuit 34 is coupled to the receiving circuit 31 and the modulation circuit 32. The mode control circuit 34 may detect the analog signal feature and/or the digital signal feature via the receiving circuit 31, adjust waveform of the signal CS according to the detection result, and output the signal CS. The output signal CS may be configured to control the modulation circuit 32 to enter the first mode (that is, the normal operating mode) or the second mode (that is, the energy-saving mode or the standby mode). For example, in an exemplary embodiment, the signal CS (that is, the first control signal) that is configured to trigger the modulation circuit 32 to enter the first mode may be at logical high, and the signal CS (that is, the second control signal) that is configured to trigger the modulation circuit 32 to enter the second mode may be at logical low, but the disclosure is not limited thereto.

In an exemplary embodiment, the mode control circuit 34 may output the signal CS containing the first control signal to the modulation circuit 32 according to the analog signal feature, so as to trigger or control the modulation circuit 32 to enter the first mode. After the modulation circuit 32 enters the first mode, the mode control circuit 34 may adjust the waveform of the control signal CS according to the digital signal feature and output the signal CS containing the second control signal to the modulation circuit 32, so as to trigger or control the modulation circuit 32 to switch to the second mode.

In an exemplary embodiment, the mode control circuit 34 may include a detection circuit (also referred to as a first detection circuit) 341, a detection circuit (also referred to as a second detection circuit) 342, and a switching circuit 343. The detection circuit 341 is coupled to the receiving circuit 31. The detection circuit 342 is coupled to the detection circuit 341. The switching circuit 343 is coupled to the detection circuit 341, the detection circuit 342, and the modulation circuit 32.

The detection circuit 341 can be configured to detect the analog signal feature via the receiving circuit 31. The detection circuit 341 may provide a signal (also referred to as a selection control signal) CS(0) to the switching circuit 343 according to the analog signal feature. For example, the signal CS(0) may reflect whether the analog signal feature meets the first condition. For example, the signal CS(0) may be at logical high in response to the analog signal feature meeting the first condition (for example, the receiving circuit 31 has received the signal S1). Alternatively, the signal CS(0) may be at logical low in response to the analog signal feature not meeting the first condition (for example, the receiving circuit 31 does not receive the signal S1). For example, the detection circuit 341 may include an analog silencer 3411. In an exemplary embodiment, the detection circuit 341 is also referred to as an analog detector or an analog feature detector.

The detection circuit 342 may be configured to detect the digital signal feature via the receiving circuit 31 (and the detection circuit 341). The detection circuit 342 may provide a signal CS(2) to the switching circuit 343 according to the digital signal feature. For example, the signal CS(2) may reflect whether the digital signal feature meets the second condition. For example, the signal CS(2) may be at logical low in response to the digital signal feature meeting the second condition (for example, the cumulative disappearance time of the signal S1 reaches the threshold value). At this time, the signal CS(2) at logical low may be regarded as carrying the second control signal. Alternatively, the signal CS(2) may be at logical high in response to the digital signal feature not meeting the second condition (for example, the cumulative disappearance time of the signal S1 has not reached the threshold value). At this time, the signal CS(2) at logical high may be regarded as not carrying the second control signal. In an exemplary embodiment, the detection circuit 342 is also referred to as a digital detector or a digital feature detector.

In an exemplary embodiment, the detection circuit 342 may include a low-speed oscillator 3421, a counting circuit 3422, and a filter circuit 3423. The low-speed oscillator 3421 is configured to generate a clock signal CK. Frequency of the clock signal CK may be lower than frequency of the signal S1. In other words, in an exemplary embodiment, assuming that the signal S1 is a high-speed signal, the clock signal CK may be a low-speed clock signal.

The counting circuit 3422 is coupled to the detection circuit 341 and the low-speed oscillator 3421. The counting circuit 3422 may update a count value CNT according to a signal receiving state of the receiving circuit 31. For example, an output of the detection circuit 341 may reflect the signal receiving state of receiving circuit 31. The counting circuit 3422 may sample the output of the detection circuit 341 through the clock signal CK. The counting circuit 3422 may update the count value CNT according to the sampling result. The count value CNT may reflect the cumulative disappearance time of the signal S1.

The filter circuit 3423 is coupled to the detection circuit 341, the counting circuit 3422, and the switching circuit 343. The filter circuit 3423 may provide the signal CS(2) carrying or not carrying the second control signal to the switching circuit 343 according to the count value CNT. For example, the filter circuit 3423 may provide the signal CS(2) without the second control signal to the switching circuit 343 in response to the count value CNT not reaching a threshold value. Alternatively, the filter circuit 3423 may provide the signal CS(2) with the second control signal to the switching circuit 343 in response to the count value CNT reaching the threshold value.

The switching circuit 343 may receive the signal CS(0), a signal CS(1), and the signal CS(2), and output the signal CS. For example, the switching circuit 343 may receive the signal CS(1) via an input terminal (also referred to as a first input terminal) and receive the signal CS(2) via another input terminal (also referred to as a second input terminal). The signal CS(1) may carry the first control signal, and the signal CS(2) may carry or not carry the second control signal. For example, the signal CS(1) may be configured to continuously provide the first control signal to the switching circuit 343, and the signal CS(2) may be configured to provide the second control signal to the switching circuit 343 at a specific time point (for example, when the digital signal feature meets the second condition). In addition, the switching circuit 343 may output the signal CS containing one of the signals CS(1) and CS(2) to the modulation circuit 32 according to the signal CS(0). For example, the signal CS(0) may be configured to control a signal transmission path of the switching circuit 343.

In an exemplary embodiment, the switching circuit 343 may turn on a signal transmission path (also referred to as a first signal transmission path) between the first input terminal and an output terminal of the switching circuit 343 according to the signal CS(0), so as to output the signal CS(1) to the modulation circuit 32. Alternatively, in an exemplary embodiment, the switching circuit 343 may turn on another signal transmission path (also referred to as a second signal transmission path) between the second input terminal and the output terminal of the switching circuit 343 according to the signal CS(0), so as to output the signal CS(2) to the modulation circuit 32. For example, the switching circuit 343 may include a multiplexer 3431.

In an exemplary embodiment, the detection circuit 342 (or the counting circuit 3422) configured to detect the digital signal feature may sample the signal (for example, the signal S1 or the output of the detection circuit 341) according to the clock signal CK. For example, the detection circuit 342 (or the counting circuit 3422) may double sample the signal according to a rising edge and a falling edge of the clock signal CK. However, the detection circuit 341 configured to detect the analog signal feature does not sample any signal (including the signal S1) according to the clock signal CK, nor execute the double sampling according to the rising edge and the falling edge of the clock signal CK.

In an exemplary embodiment, when the receiving circuit 31 receives the signal S1, the detection circuit 341 may detect that the analog signal feature meets the first condition. The detection circuit 341 may output the signal CS(0) at logical high in response to the analog signal feature meeting the first condition. The signal CS(0) at logical high may be configured to turn on the first signal transmission path of the switching circuit 343. The switching circuit 343 may turn on the first signal transmission path according to the signal CS(0) at logical high and output the signal CS(1) carrying the first control signal as the signal CS to the modulation circuit 32. The modulation circuit 32 may enter the first mode in response to the signal CS (that is, the signal CS(1) carrying the first control signal). The modulation circuit 32 may modulate the signal S1 and output the signal S2 in the first mode.

In an exemplary embodiment, when the receiving circuit 31 does not receive the signal S1, the detection circuit 341 may detect that the analog signal feature does not meet the first condition. The detection circuit 341 may change waveform of the signal CS(0), for example, output the signal CS(0) at logical low in response to the analog signal feature not meeting the first condition. The signal CS(0) at logical low may be configured to turn on the second signal transmission path of the switching circuit 343. The switching circuit 343 may turn on the second signal transmission path according to the signal CS(0) at logical low and output the signal CS(2) as the signal CS to the modulation circuit 32.

In an exemplary embodiment, at an initial stage when the receiving circuit 31 does not receive the signal S1, the cumulative disappearance time of the signal S1 is still very short. Therefore, in the initial stage when the receiving circuit 31 does not receive the signal S1, the detection circuit 342 may detect that the digital signal feature does not meet the second condition (for example, the count value CNT does not reach the threshold value). The detection circuit 342 may output the signal CS(2) not carrying the second control signal in response to the digital signal feature not meeting the second condition. In this case (that is, the signal CS(2) does not carry the second control signal), even when the switching circuit 343 outputs the signal CS(2) to the modulation circuit 32, the modulation circuit 32 continues to operate in the first mode.

In an exemplary embodiment, when the receiving circuit 31 does not receive the signal S1 for a period of time and the detection circuit 341 continues to detect that the analog signal feature does not meet the first condition, the detection circuit 342 may detect that the digital signal feature meets the second condition (for example, the count value CNT reaches the threshold value). The detection circuit 342 may output the signal CS(2) carrying the second control signal to the modulation circuit 32 in response to the digital signal feature meeting the second condition. In this case (that is, the signal CS(2) carries the second control signal and the switching circuit 343 continues to output the signal CS(2) to the modulation circuit 32), the modulation circuit 32 may switch to the second mode.

Figure 4:
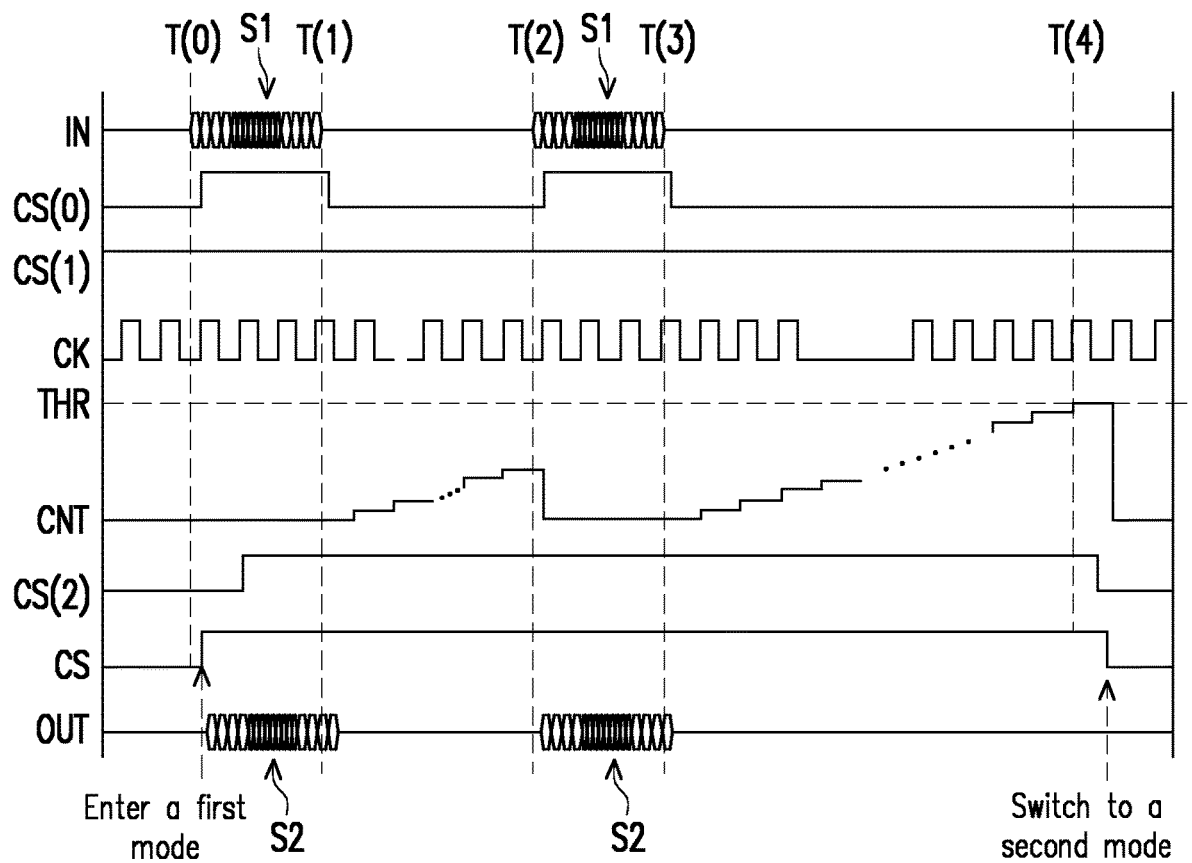
FIG. 4 is a schematic diagram of a signal time sequence according to an exemplary embodiment of the disclosure.

FIG. 4 is a schematic diagram of a signal time sequence according to an exemplary embodiment of the disclosure. With reference to FIGS. 3 and 4, it is assumed that before a time point T(0), the modulation circuit 32 is in the second mode (that is, the energy-saving mode or the standby mode). At the time point T(0), the receiving circuit 31 receives the signal S1. Therefore, after the time point T(0), the modulation circuit 32 is switched to the first mode (that is, the normal operating mode) to modulate the signal S1, and the sending circuit 33 continues to output the signal S2 generated by modulating the signal S1.

Between time points T(1) and T(2), the receiving circuit 31 does not receive the signal S1. However, between the time points T(1) and T(2), the continuously increasing count value CNT does not reach a threshold value THR. Therefore, between the time points T(1) and T(2), even when the receiving circuit 31 does not receive the signal S1, the modulation circuit 32 remains in the first mode (that is, the normal operating mode). In addition, at the time point T(2), the count value CNT may be reset.

Between the time point T(2) and a time point T(3), the receiving circuit 31 continuously receives the signal S1. At the same time, the modulation circuit 32 continuously modulates the signal S1 in the first mode (that is, the normal operating mode), and the sending circuit 33 continuously outputs the signal S2.

Between the time point T(3) and a time point T(4), the receiving circuit 31 does not receive the signal S1. After the time point T(3), the count value CNT continues to increase as the cumulative disappearance time of the signal S1 increases. In particular, at the time point T(4), the continuously increasing count value CNT reaches the threshold value. Therefore, after the time point T(4), the modulation circuit 32 is being switched back to the second mode (that is, the energy-saving mode or the standby mode), so as to wait for the next signal S1 to be awakened. In addition, after the time point T(4), the count value CNT may be reset.

In other words, according to the exemplary embodiments of FIGS. 1 to 4, the signal re-driving device (or the modulation circuit) may enter the first mode (that is, the normal operating mode) according to the analog signal feature, and the analog signal feature reflects in an analog form whether the pending processing signal S1 is received. This effectively improves the wake-up efficiency of the signal re-driving device (or the modulation circuit).

In addition, according to the exemplary embodiments of FIGS. 1 to 4, the signal re-driving device (or the modulation circuit) may switch from the first mode to the second mode (that is, the energy-saving mode or the standby mode) according to the digital signal feature, and the digital signal feature reflects the cumulative disappearance time of the signal S1 in a digital form (for example, the count value CNT in FIGS. 3 and 4). In this way, the signal re-driving device (or the modulation circuit) may be allowed to enter the energy-saving mode or the standby mode at a correct timing as far as possible (for example, delaying the time point in which the energy-saving or standby mode is entered).

Figure 5:
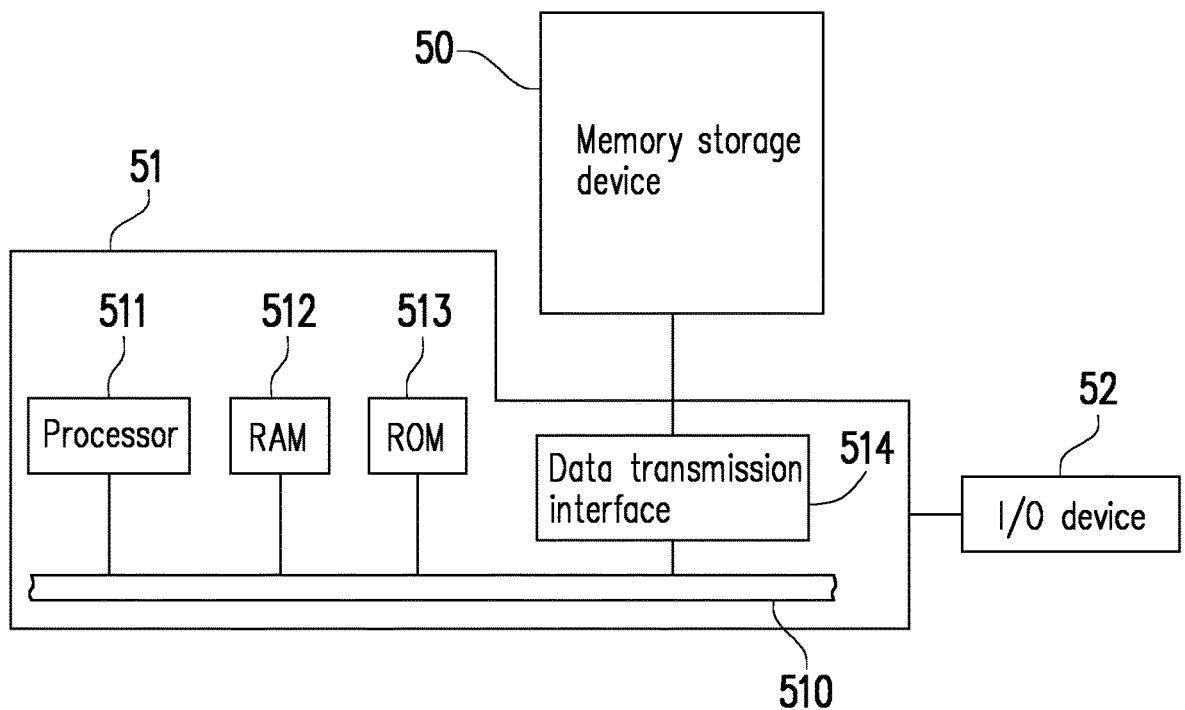
FIG. 5 is a schematic diagram of a host system, a memory storage device, and an input/output (I/O) device according to an exemplary embodiment of the disclosure.
Figure 6:
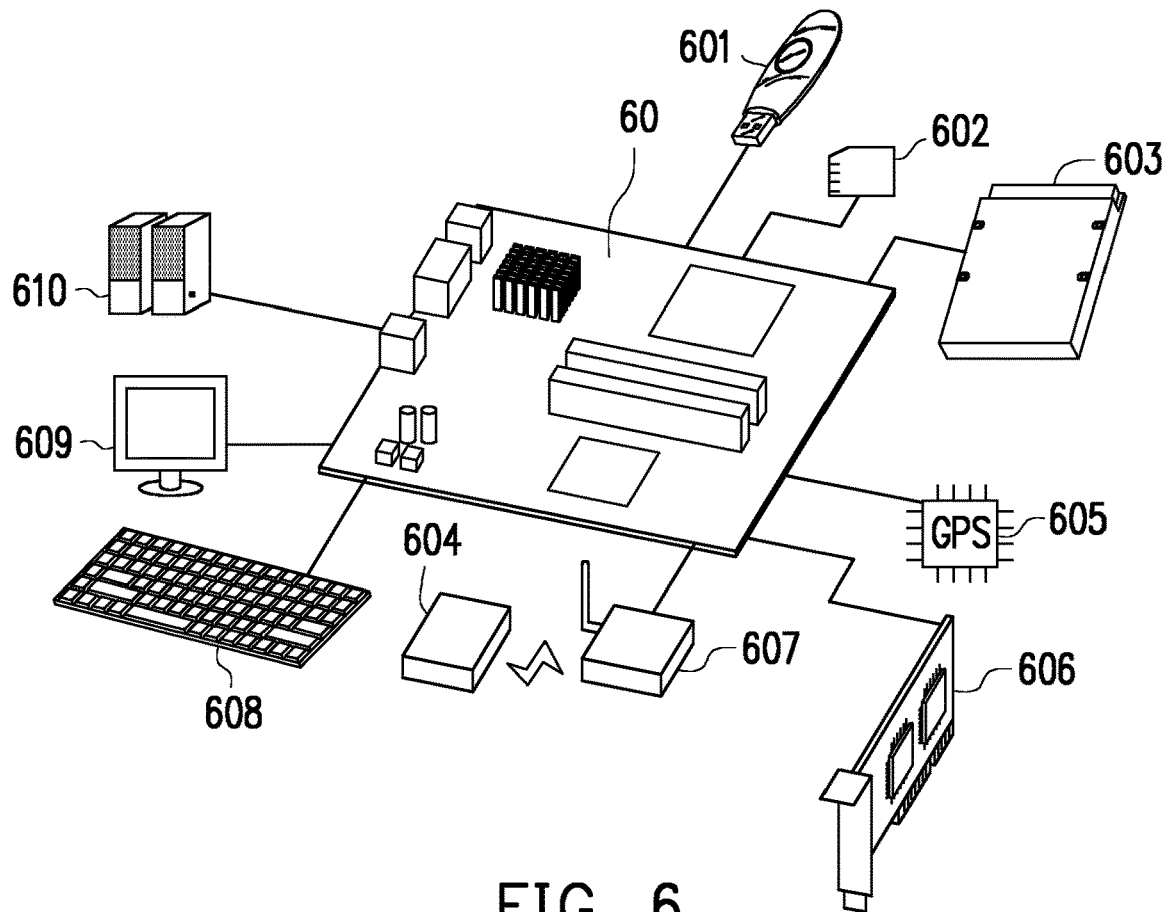
FIG. 6 is a schematic diagram of a host system, a memory storage device, and an I/O device according to an exemplary embodiment of the disclosure.

FIG. 5 is a schematic diagram of a host system, a memory storage device, and an input/output (I/O) device according to an exemplary embodiment of the disclosure. FIG. 6 is a schematic diagram of a host system, a memory storage device, and an I/O device according to an exemplary embodiment of the disclosure.

With reference to FIGS. 5 and 6, a host system 51 generally includes a processor 511, a random access memory (RAM) 512, a read-only memory (ROM) 513, and a data transmission interface 514. The processor 511, the random access memory 512, the read-only memory 513, and the data transmission interface 514 are all coupled to a system bus 510.

In the exemplary embodiment, the host system 51 is coupled to a memory storage device 50 through the data transmission interface 514. For example, the host system 51 may store data to the memory storage device 50 or read data from the memory storage device 50 via the data transmission interface 514. In addition, the host system 51 is coupled to an I/O device 52 through the system bus 510. For example, the host system 51 may transmit an output signal to the I/O device 52 or receive an input signal from the I/O device 52 via the system bus 510.

In an exemplary embodiment, the processor 511, the random access memory 512, the read-only memory 513, and the data transmission interface 514 may be disposed on a motherboard 60 of the host system 51. A number of the data transmission interface 514 may be one or more. Through the data transmission interface 514, the motherboard 60 may be coupled to the memory storage device 50 in a wired or wireless manner. The memory storage device 50 may be, for example, a flash drive 601, a memory card 602, a solid state drive (SSD) 603, or a wireless memory storage device 604. The wireless memory storage device 604 may be, for example, a Near Field Communication (NFC) memory storage device, a wireless fax (WiFi) memory storage device, a Bluetooth memory storage device, or a low-power Bluetooth memory storage device (for example, iBeacon) and other memory storage devices based on various wireless communication technologies. In addition, the motherboard 60 may also be coupled to various I/O devices such as a Global Positioning System (GPS) module 605, a network interface card 606, a wireless transmission device 607, a keyboard 608, a screen 609, or a speaker 610 through the system bus 510. For example, in an exemplary embodiment, the motherboard 60 may access the wireless memory storage device 604 through the wireless transmission device 607.

Figure 7:
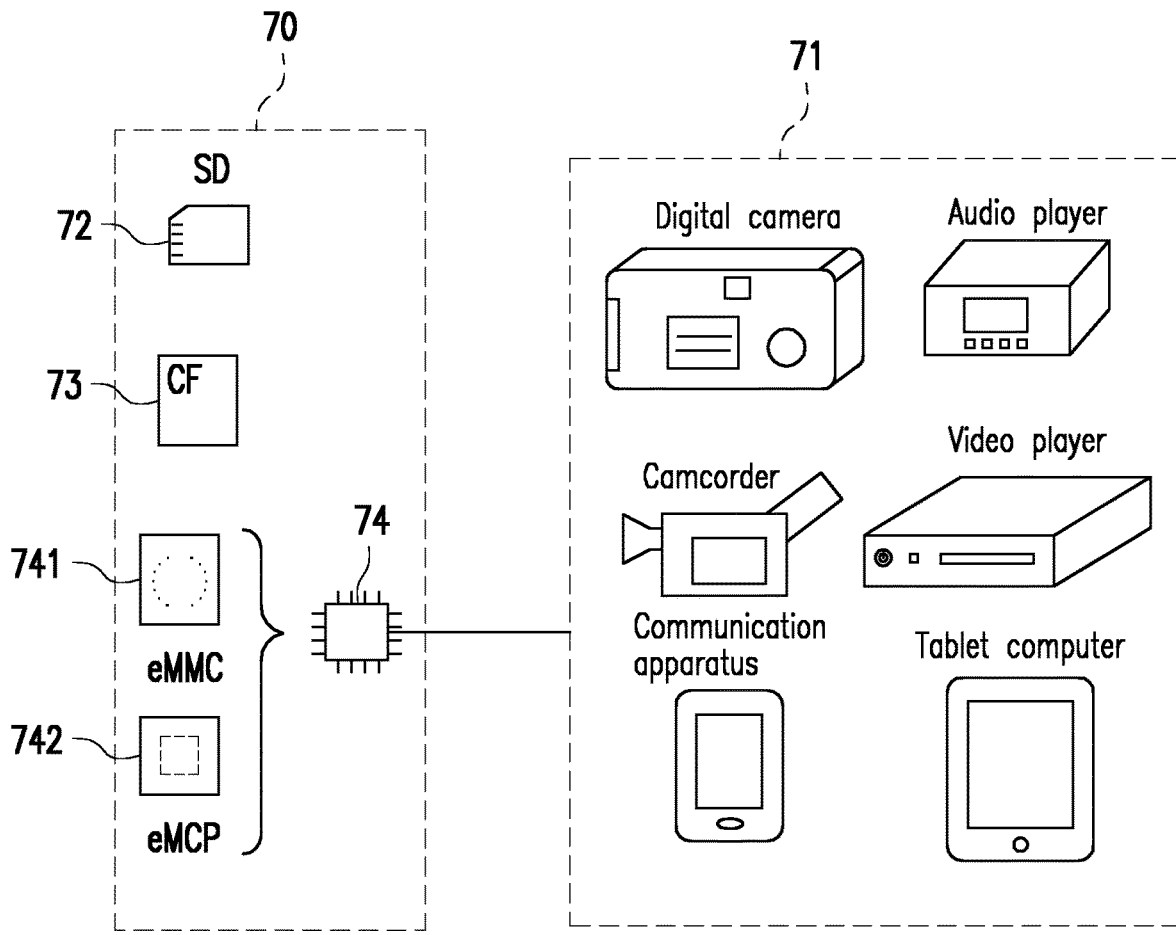
FIG. 7 is a schematic diagram of a host system and a memory storage device according to an exemplary embodiment of the disclosure.

In an exemplary embodiment, the host system is any system that may substantially cooperate with a memory storage device to store data. Although in the above exemplary embodiment, the host system is described as a computer system, FIG. 7 is a schematic diagram of a host system and a memory storage device according to an exemplary embodiment of the disclosure. With reference to FIG. 7, in another exemplary embodiment, a host system 71 may also be a system such as a digital camera, a video camera, a communication device, an audio player, a video player, or a tablet computer, and a memory storage device 70 may be various non-volatile memory storage devices such as a Secure Digital (SD) card 72, a CompactFlash (CF) card 73, or an embedded storage device 74 used by the host system 71. The embedded storage device 74 includes various embedded storage devices such as an embedded MultiMedia Card (eMMC) 741 and/or an embedded Multi-Chip Package (eMCP) storage device 742 that couples a memory module directly to a substrate of the host system.

Figure 8:
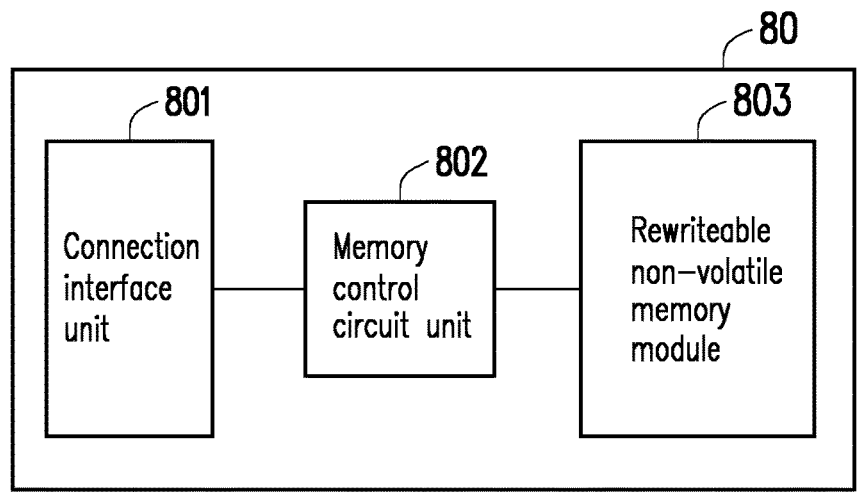
FIG. 8 is a schematic diagram of a memory storage device according to an exemplary embodiment of the disclosure.

FIG. 8 is a schematic diagram of a memory storage device according to an exemplary embodiment of the disclosure. With reference to FIG. 8, a memory storage device 80 includes a connection interface unit 801, a memory control circuit unit 802, and a rewritable non-volatile memory module 803.

The connection interface unit 801 is configured to couple the memory storage device 80 to the host system. In the exemplary embodiment, the connection interface unit 801 is compatible with the SATA standard. However, it must be understood that the disclosure is not limited thereto, and the connection interface unit 801 may also be in compliance with the Parallel Advanced Technology Attachment (PATA) standard, the Institute of Electrical and Electronic Engineers (IEEE) 1394 standard, the PCI Express standard, the USB standard, the SD interface standard, the Ultra High-Speed I (UHS-I) interface standard, the Ultra High-Speed II (UHS-II) interface standard, the Memory Stick (MS) interface standard, the MCP interface standard, the MMC interface standard, the eMMC interface standard, the Universal Flash Storage (UFS) interface standard, the eMCP interface standard, the CF interface standard, the Integrated Device Electronics (IDE) standard or other suitable standards. The connection interface unit 801 and the memory control circuit unit 802 may be packaged in a chip, or the connection interface unit 801 may be disposed outside a chip that includes the memory control circuit unit 802.

The memory control circuit unit 802 is configured to execute multiple logic gates or control commands implemented in hardware or firmware, and to perform operations such as data writing, reading, or erasing in the rewriteable non-volatile memory module 803 according to a command of the host system.

The rewriteable non-volatile memory module 803 is coupled to the memory control circuit unit 802 and is configured to store data written by the host system. The rewriteable non-volatile memory module 803 may be a Single-Level Cell (SLC) NAND flash memory module (that is, a flash memory module that may store one data bit in a memory cell), a Multi-Level Cell (MLC) NAND flash memory module (that is, a flash memory module that may store two data bits in a memory cell), a Trinary-Level Cell (TLC) NAND flash memory module (that is, a flash memory module that may store three data bits in a memory cell), a Quad-Level Cell (QLC) NAND flash memory module (that is, a flash memory module that may store four data bits in a memory cell), other flash memory modules, or other memory modules with the same characteristic.

Each of the memory cells in the rewriteable non-volatile memory module 803 stores one or more bits by changing a voltage (hereinafter also referred to as a threshold voltage). Specifically, there is a charge trapping layer between a control gate and a channel of each of the memory cells. By applying a writing voltage to the control gate, an amount of electrons in the charge trapping layer may be changed, thereby changing the threshold voltage of the memory cell. This operation of changing the threshold voltage of the memory cell is also called "writing of data to the memory cell" or "programming of the memory cell". Each of the memory cells in the rewriteable non-volatile memory module 803 has multiple storage states following changes in the threshold voltage. It is possible to determine which storage state a memory cell belongs to by applying a reading voltage, thereby obtaining the one or more bits stored in the memory cell.

In the exemplary embodiment, the memory cells of the rewritable non-volatile memory module 803 constitute multiple physical programming units, and the physical programming units constitute multiple physical erasing units. Specifically, the memory cells on a same word line form one or more physical programming units. If each of the memory cells may store more than 2 bits, the physical programming units on the same word line may be at least classified into a lower physical programming unit and an upper physical programming unit. For example, a least significant bit (LSB) of a memory cell belongs to the lower physical programming unit, and a most significant bit (MSB) of a memory cell belongs to the upper physical programming unit. In general, in the MLC NAND flash memory, a writing speed of the lower physical programming unit is greater than a writing speed of the upper physical programming unit, and/or a reliability of the lower physical programming unit is higher than a reliability of the upper physical programming unit.

In the exemplary embodiment, the physical programming unit is the smallest unit of programming. That is, the physical programming unit is the smallest unit for writing data. For example, the physical programming unit is a physical page or a physical sector. When the physical programming unit is a physical page, these physical programming units usually include a data bit region and a redundancy bit region. The data bit area contains multiple physical sectors that are configured to store user data, and the redundancy bit area is configured to store system data (for example, management data such as error correcting codes). In the exemplary embodiment, the data bit region includes 32 physical sectors, and size of one physical sector is 512 bytes (B). However, in other exemplary embodiments, the data bit region may also include 8, 16, or more or less physical sectors, and the size of each physical sector may also be larger or smaller. On the other hand, the physical erasing unit is the smallest unit of erasure. That is, each of the physical erasing units contains a smallest number of memory cells that are erased together. For example, the physical erasing unit is a physical block.

Figure 9:
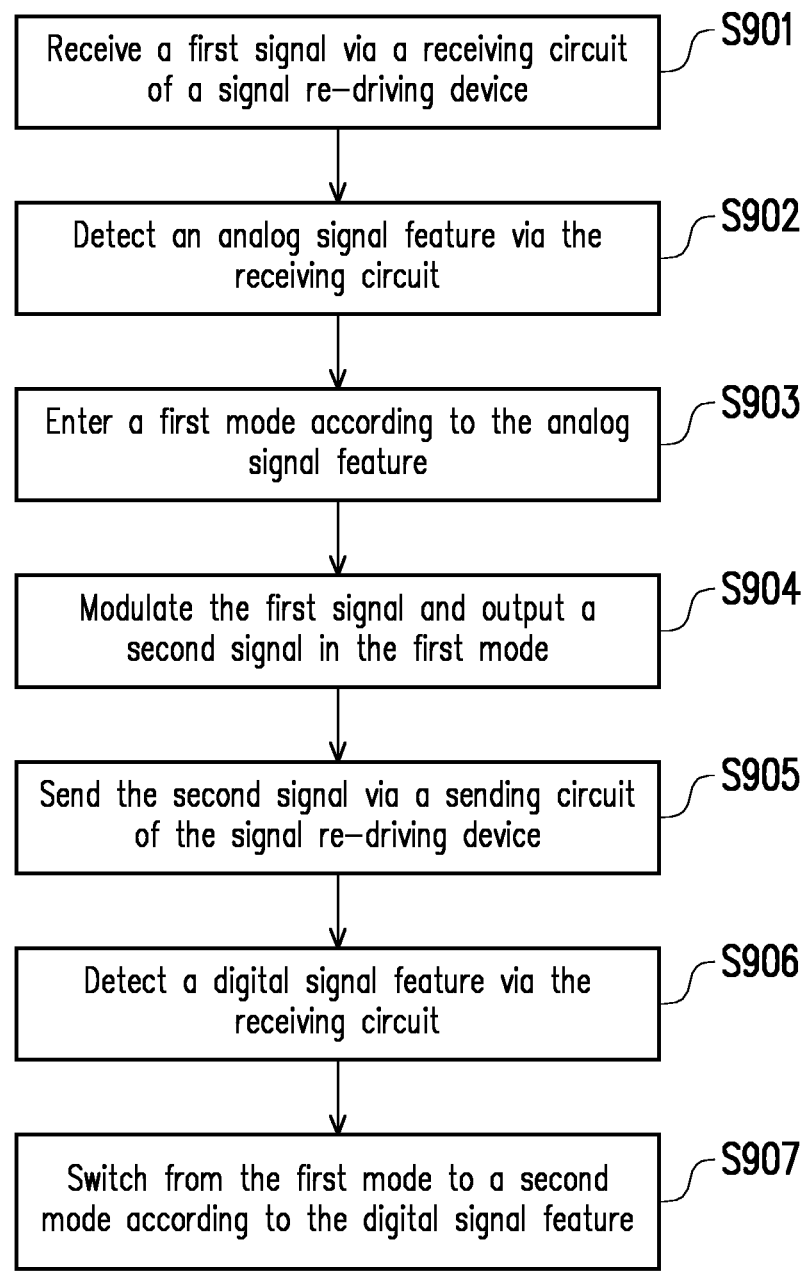
FIG. 9 is a flowchart of a mode control method according to an exemplary embodiment of the disclosure.

FIG. 9 is a flowchart of a mode control method according to an exemplary embodiment of the disclosure. With reference to FIG. 9, in Step S901, the first signal is received via the receiving circuit of the signal re-driving device. In Step S902, the analog signal feature is detected via the receiving circuit. In Step S903, the first mode is entered according to the analog signal feature. In Step S904, in the first mode, the first signal is modulated and the second signal is outputted. In Step S905, the second signal is sent via the sending circuit of the signal re-driving device. In Step S906, the digital signal feature is detected via the receiving circuit. In Step S907, the first mode is switched to the second mode according to the digital signal feature.

However, each step in FIG. 9 has been described in detail as above, and is not repeated here. It should be noted that each step in FIG. 9 may be implemented as multiple program codes or circuits, but the disclosure is not limited thereto. In addition, the method in FIG. 9 may be used in conjunction with the above exemplary embodiments, or alone, but the disclosure is not limited thereto.

In summary, in the exemplary embodiments of the disclosure, the signal re-driving device (or the modulation circuit) is awakened according to the analog signal detection method, and in conjunction with the digital signal detection method, the signal re-driving device (or the modulation circuit) is enabled to re-enter the energy-saving mode or standby mode. In this way, the signal re-driving device may maintain a balance between power saving and good signal transmission quality.

Although the disclosure has been described with reference to the above-mentioned embodiments, it is not intended to be exhaustive or to limit the disclosure to the precise form or to exemplary embodiments disclosed. It is apparent to one of ordinary skill in the art that modifications to the described embodiments may be made without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. A signal re-driving device, comprising:
   a receiving circuit;
   a modulation circuit, coupled to the receiving circuit;
   a sending circuit, coupled to the modulation circuit; and
   a mode control circuit, coupled to the receiving circuit and the modulation circuit,
   wherein the receiving circuit is configure to receive a first signal,
   the mode control circuit is configured to detect an analog signal feature via the receiving circuit and control the modulation circuit to enter a first mode according to the analog signal feature,
   the modulation circuit is configured to modulate the first signal and output a second signal in the first mode,
   the sending circuit is configured to send the second signal, and
   the mode control circuit is further configured to detect a digital signal feature via the receiving circuit and control the modulation circuit to switch from the first mode to a second mode according to the digital signal feature,
   wherein the first mode is a normal operating mode and the second mode is an energy-saving mode or a standby mode.

2. The signal re-driving device according to claim 1, wherein a power consumption of the modulation circuit operating in the first mode is greater than a power consumption of the modulation circuit operating in the second mode.

3. The signal re-driving device according to claim 1, wherein the modulation circuit is disabled in the second mode.

4. The signal re-driving device according to claim 1, wherein the analog signal feature reflects whether the first signal exists.

5. The signal re-driving device according to claim 1, wherein the digital signal feature reflects a cumulative disappearance time of the first signal.

6. The signal re-driving device according to claim 1, wherein
   the operation of controlling the modulation circuit to enter the first mode according to the analog signal feature comprises:
      outputting a first control signal to the modulation circuit according to the analog signal feature, wherein the first control signal is configured to trigger the modulation circuit to enter the first mode; and
   the operation of controlling the modulation circuit to switch from the first mode to the second mode according to the digital signal feature comprises:
      outputting a second control signal to the modulation circuit according to the digital signal feature, wherein the second control signal is configured to trigger the modulation circuit to switch to the second mode.

7. The signal re-driving device according to claim 6, wherein the mode control circuit comprises:
a first detection circuit, coupled to the receiving circuit;
a second detection circuit, coupled to the first detection circuit; and
a switching circuit, coupled to the first detection circuit, the second detection circuit, and the modulation circuit,
wherein the first detection circuit is configured to provide a selection control signal to the switching circuit according to the analog signal feature,
the second detection circuit is configured to provide the second control signal to the switching circuit according to the digital signal feature, and
the switching circuit is configured to output one of the first control signal and the second control signal to the modulation circuit according to the selection control signal.

8. The signal re-driving device according to claim 7, wherein the switching circuit receives the first control signal via a first input terminal and receives the second control signal via a second input terminal, and
the switching circuit turns on a first signal transmission path to output the first control signal or turns on a second signal transmission path to output the second control signal according to the selection control signal.

9. The signal re-driving device according to claim 7, wherein the digital signal feature comprises a count value, and the second detection circuit comprises:
a counting circuit, configured to update the count value according to a signal receiving state of the receiving circuit; and
a filter circuit, coupled to the counting circuit and is configured to provide the second control signal to the switching circuit according to the count value.

10. The signal re-driving device according to claim 9, wherein the operation of providing the second control signal to the switching circuit according to the count value comprises:
providing the second control signal to the switching circuit in response to the count value reaching a threshold value.

11. A data storage system, comprising:
a processing device;
a memory storage device; and
a signal re-driving device, coupled between the processing device and the memory storage device, wherein the signal re-driving device is configured to:
receive a first signal from the processing device via a receiving circuit in the signal re-driving device,
detect an analog signal feature via the receiving circuit and enter a first mode according to the analog signal feature,
modulate the first signal and output a second signal in the first mode,
send the second signal to the memory storage device via a sending circuit in the signal re-driving device, and
detect a digital signal feature via the receiving circuit and switch from the first mode to a second mode according to the digital signal feature,
wherein the first mode is a normal operating mode and the second mode is an energy-saving mode or a standby mode.

12. The data storage system according to claim 11, wherein a power consumption of the signal re-driving device operating in the first mode is greater than a power consumption of the signal re-driving device operating in the second mode.

13. The data storage system according to claim 11, wherein a modulation circuit in the signal re-driving device is disabled in the second mode.

14. The data storage system according to claim 11, wherein the analog signal feature reflects whether the first signal exists.

15. The data storage system according to claim 11, wherein the digital signal feature reflects a cumulative disappearance time of the first signal.

16. The data storage system according to claim 11, wherein the signal re-driving device is further configured to:
output a first control signal to a modulation circuit in the signal re-driving device according to the analog signal feature, wherein the modulation circuit is configured to modulate the first signal, and the first control signal is configured to trigger the modulation circuit to enter the first mode; and
output a second control signal to the modulation circuit according to the digital signal feature, wherein the second control signal is configured to trigger the modulation circuit to switch to the second mode.

17. The data storage system according to claim 16, wherein the signal re-driving device is further configured to:
provide a selection control signal to a switching circuit in the signal re-driving device according to the analog signal feature,
provide the second control signal to the switching circuit according to the digital signal feature, and
output one of the first control signal and the second control signal to the modulation circuit via the switching circuit according to the selection control signal.

18. The data storage system according to claim 17, wherein the operation of outputting the one of the first control signal and the second control signal to the modulation circuit via the switching circuit according to the selection control signal comprises:
receiving the first control signal via a first input terminal of the switching circuit;
receiving the second control signal via a second input terminal of the switching circuit; and
turning on a first signal transmission path of the switching circuit to output the first control signal or turning on a second signal transmission path of the switching circuit to output the second control signal according to the selection control signal.

19. The data storage system according to claim 17, wherein the digital signal feature comprises a count value, and the operation of outputting the one of the first control signal and the second control signal to the modulation circuit via the switching circuit according to the selection control signal comprises:
updating the count value according to a signal receiving state of the receiving circuit; and
providing the second control signal to the switching circuit according to the count value.

20. The data storage system according to claim 19, wherein the operation of providing the second control signal to the switching circuit according to the count value comprises:
providing the second control signal to the switching circuit in response to the count value reaching a threshold value.

21. A mode control method, applicable to a signal re-driving device, the mode control method comprising:

receiving a first signal via a receiving circuit of the signal re-driving device;

detecting an analog signal feature via the receiving circuit;

entering a first mode according to the analog signal feature;

modulating the first signal and outputting a second signal in the first mode;

sending the second signal via a sending circuit of the signal re-driving device;

detecting a digital signal feature via the receiving circuit; and switching from the first mode to a second mode according to the digital signal feature, wherein the first mode is a normal operating mode and the second mode is an energy-saving mode or a standby mode.

22. The mode control method according to claim 21, wherein a power consumption of the signal re-driving device operating in the first mode is greater than a power consumption of the signal re-driving device operating in the second mode.

23. The mode control method according to claim 21, further comprising:

disabling a modulation circuit in the signal re-driving device in the second mode.

24. The mode control method according to claim 21, wherein the analog signal feature reflects whether the first signal exists.

25. The mode control method according to claim 21, wherein the digital signal feature reflects a cumulative disappearance time of the first signal.

26. The mode control method according to claim 21, further comprising:

outputting a first control signal to a modulation circuit in the signal re-driving device according to the analog signal feature, wherein the modulation circuit is configured to modulate the first signal, and the first control signal is configured to trigger the modulation circuit to enter the first mode; and outputting a second control signal to the modulation circuit according to the digital signal feature, wherein the second control signal is configured to trigger the modulation circuit to switch to the second mode.

27. The mode control method according to claim 26, further comprising:

providing a selection control signal to a switching circuit in the signal re-driving device according to the analog signal feature;

providing the second control signal to the switching circuit according to the digital signal feature; and outputting one of the first control signal and the second control signal to the modulation circuit via the switching circuit according to the selection control signal.

28. The mode control method according to claim 27, wherein the operation of outputting the one of the first control signal and the second control signal to the modulation circuit via the switching circuit according to the selection control signal comprises:

receiving the first control signal via a first input terminal of the switching circuit;

receiving the second control signal via a second input terminal of the switching circuit; and turning on a first signal transmission path of the switching circuit to output the first control signal or turning on a second signal transmission path of the switching circuit to output the second control signal according to the selection control signal.

29. The mode control method according to claim 27, the digital signal feature comprises a count value, and the step of outputting the one of the first control signal and the second control signal to the modulation circuit via the switching circuit according to the selection control signal comprises:

updating the count value according to a signal receiving state of the receiving circuit; and providing the second control signal to the switching circuit according to the count value.

30. The mode control method according to claim 29, wherein the step of providing the second control signal to the switching circuit according to the count value comprises:

providing the second control signal to the switching circuit in response to the count value reaching a threshold value.

* * * * *